United States Patent
Zhang

(10) Patent No.: US 9,210,579 B2
(45) Date of Patent: Dec. 8, 2015

(54) SYSTEM AND METHOD FOR COMMUNICATING IN A WIRELESS COMMUNICATIONS SYSTEM

(75) Inventor: Hang Zhang, Nepean (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 202 days.

(21) Appl. No.: 12/902,936

(22) Filed: Oct. 12, 2010

(65) Prior Publication Data

US 2011/0085471 A1    Apr. 14, 2011

Related U.S. Application Data

(60) Provisional application No. 61/251,377, filed on Oct. 14, 2009.

(51) Int. Cl.
*H04W 16/00* (2009.01)
*H04W 84/02* (2009.01)

(52) U.S. Cl.
CPC .............. *H04W 16/00* (2013.01); *H04W 84/02* (2013.01)

(58) Field of Classification Search
CPC ... H04W 72/04; H04W 76/022; H04W 80/04; H04W 80/045; H04W 88/08; H04W 88/12; H04W 88/16; H04W 16/00; H04W 84/02
USPC ......... 370/315, 328–330, 338, 341, 434, 447, 370/462; 455/422.1, 446, 11.1, 561, 445, 455/15
See application file for complete search history.

(56) References Cited

U.S. PATENT DOCUMENTS

| | | | |
|---|---|---|---|
| 8,023,469 B2* | 9/2011 | Sachs et al. | 370/331 |
| 2003/0185190 A1* | 10/2003 | Chitrapu et al. | 370/338 |
| 2004/0085951 A1* | 5/2004 | Rezaiifar et al. | 370/352 |
| 2005/0157690 A1 | 7/2005 | Frank et al. | |
| 2007/0097926 A1* | 5/2007 | Liu et al. | 370/335 |
| 2009/0124259 A1* | 5/2009 | Attar et al. | 455/436 |
| 2009/0305699 A1* | 12/2009 | Deshpande et al. | 455/434 |
| 2010/0034089 A1* | 2/2010 | Kovvali et al. | 370/235 |

(Continued)

FOREIGN PATENT DOCUMENTS

| | | |
|---|---|---|
| CN | 1833451 A | 9/2006 |
| CN | 101030802 A | 9/2007 |
| WO | WO 2009/103678 A1 | 8/2009 |

OTHER PUBLICATIONS

Written Opinion and International Search Report, International Application No. PCT/CN2010/077725, Applicant: Huawei Technologies Co., Ltd., et al., mailing date: Jan. 20, 2011, 11 pages.

(Continued)

*Primary Examiner* — Charles C Jiang
*Assistant Examiner* — Jeremy Costin
(74) *Attorney, Agent, or Firm* — Slater & Matsil, LLP

(57) ABSTRACT

A system and method for communicating in a wireless communications system are provided. A communications system includes a macro subnet, and a macro subnet controller coupled to a core network and to the macro subnet. The macro subnet provides a hierarchical topology for a subset of communications devices in the communications system that are in the macro subnet, and the macro subnet controller manages connections of communications devices in the macro subnet, manages network topology, manages data delivery, and manages security in the macro subnet.

30 Claims, 11 Drawing Sheets

(56) References Cited

U.S. PATENT DOCUMENTS

| | | | |
|---|---|---|---|
| 2010/0040023 A1* | 2/2010 | Gallagher et al. | 370/331 |
| 2010/0046418 A1* | 2/2010 | Horn et al. | 370/315 |
| 2010/0208693 A1* | 8/2010 | Centonza | 370/331 |
| 2010/0275082 A1* | 10/2010 | Haustein et al. | 714/748 |
| 2010/0296448 A1* | 11/2010 | Vainikka et al. | 370/328 |
| 2012/0020278 A1* | 1/2012 | Moberg et al. | 370/315 |
| 2012/0082057 A1* | 4/2012 | Welin et al. | 370/252 |
| 2012/0087276 A1* | 4/2012 | Huang et al. | 370/253 |
| 2012/0207078 A1* | 8/2012 | Hwang et al. | 370/315 |

OTHER PUBLICATIONS

"$3^{rd}$ Generation Partnership Project; Technical Specification Group Radio Access Network; Evolved Universal Terrestrial Radio Access (E-UTRA); Relay architectures for E-UTRA (LTE-Advanced) (Release 9)," 3GPP TR 36.806, V0.1.0, Sep. 2009, 20 pages.

* cited by examiner

SYSTEM AND METHOD FOR COMMUNICATING IN A WIRELESS COMMUNICATIONS SYSTEM

This application claims the benefit of U.S. Provisional Application No. 61/251,377, filed Oct. 14, 2009, entitled "Wireless Network Aware Protocol Architecture Enabling Lower Overhead and Hierarchical Structure of Wireless Network," which application is hereby incorporated herein by reference.

TECHNICAL FIELD

The present invention relates generally to wireless communications, and more particularly to a system and method for communicating in a wireless communications system.

BACKGROUND

Wireless communications systems have made great advances in recent history, now offering near wireline communications system data rates, excellent reliability, low deployment costs, high degree of mobility, and so forth. With such a long list of advantages, wireless communications systems and attendant users are expected grow at a faster rate than ever before.

One form of wireless communications system is a heterogeneous network (HET-NET). A HET-NET may include communications controllers of differing power. For example, a HET-NET may include a system of macro cells that operate at high power levels, a system of low power cells, such as pico cells and relay nodes, which operate at reduced power levels. The macro cells and the low power cells may be part of a planned network operated by one or more operators of the wireless communications system. A HET-NET may also include a system of ad-hoc nodes, such as femto cells, Home eNBs, and so on. The ad-hoc network may be user deployed communications controllers that a user may add in order to improve performance in a small area, such as a home, an apartment building, a business, or so forth. Collectively, the communications controllers (macro cells, low power cells, ad-hoc nodes, and so on) may be referred to as nodes without loss of generality.

A HET-NET may be considered to be a multi-layer communications system, with the macro cells making up a first layer, and the low power cells making up a second layer. A HET-NET with multiple relay nodes may offer the following benefits: lower power transmission (less power consumption and less electromagnetic pollution), enhanced coverage and capacity at low cost, and flexible deployments.

Packet (information) delivery over a wireless communications system faces the same set of challenges like wireline communications but with additional wireless specific challenges. The challenges include:

Geographically co-located nodes from multiple network layers may present co-channel interference across different system layers (macro, micro, pico, and so forth, layers);
Scalability of operations, administration, and maintenance (OAM): a significant number of low power nodes may make it more complicated to perform OAM for the nodes;
Scarce radio resources;
Dynamic loading changes;
Frequent mobile handovers;
Severe security challenge;
Power/battery life restrictions; and
Dynamic topology.

SUMMARY OF THE INVENTION

These and other problems are generally solved or circumvented, and technical advantages are generally achieved, by preferred embodiments of the present invention which provide a system and method for communicating in a wireless communications system.

In accordance with a preferred embodiment of the present invention, a communications system is provided. The communications system includes a subnet and a subnet controller coupled to the subnet and a core network. The subnet provides a hierarchical topology for a subset of communications devices in the communications system that are in the subnet, and the subnet controller manages connections of communications devices in the subnet, manages a network topology of the subnet, manages data delivery in and out of the subnet, manages a coordination of nodes within the subnet for performance optimization, and manages security in the subnet.

In accordance with another preferred embodiment of the present invention, a network entity is provided. The network entity includes a receiver, a transmitter, a communications unit to be coupled to the receiver and the transmitter, and a processor coupled to the communications unit. The receiver receives communications, and the transmitter transmits communications. The communications unit utilizes a wireless network-aware communications protocol to process communications intended for or received from a communications device coupled to the network entity, and the processor executes programs and applications.

In accordance with another preferred embodiment of the present invention, a method for network entity operation is provided. The method includes receiving a transmission, processing the transmission utilizing a wireless network-aware communications protocol, and transmitting the processed transmission. The wireless network-aware communications protocol is designed to reduce communications overhead in transmissions taking place in a wireless network.

An advantage of an embodiment is that techniques for reducing communications overhead are provided. Reducing overhead is more important in a wireless communications system since bandwidth is more limited than in a wireline communications system.

A further advantage of an embodiment is that a hierarchical structure is provided for wireless communications systems. The hierarchical structure allows for the wireless communications system to be readily upgraded and enhanced. Furthermore, the hierarchical structure allows for a reduction in communications overhead.

Yet another advantage of an embodiment is that wireless-aware protocol stacks are provided. The wireless-aware protocol stacks address the limitations/restrictions involved with wireless communications in a wireless communications system.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a Third Generation Partnership Project (3GPP) Long Term Evolution (LTE) compliant wireless communications system with a deployment that includes multiple layers, including macro layer, and low power layer. The invention may also be applied, however, to other wireless communications systems, such as WiMAX, and so forth, compliant wireless communications systems that support multiple layers.

Figure 1A:
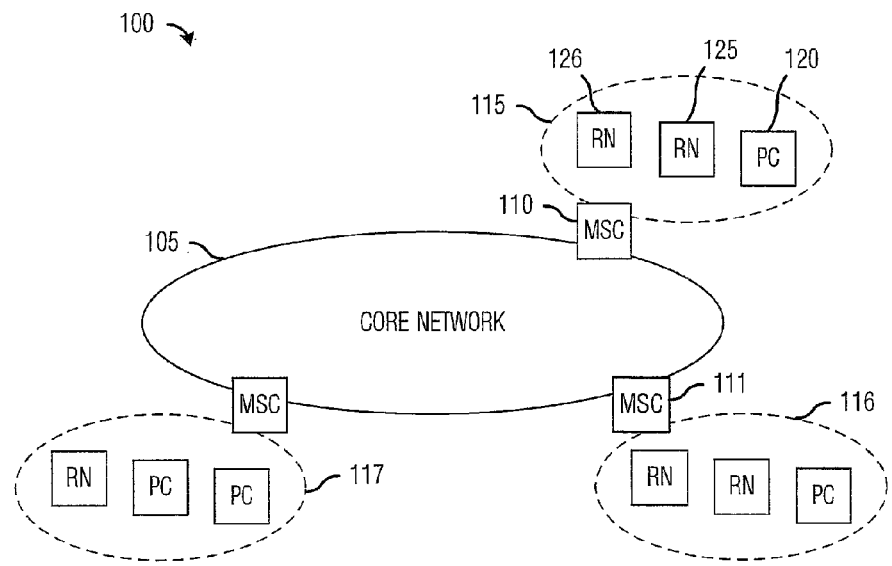
FIG. 1a is a diagram of a wireless communications system.

FIG. 1a illustrates a wireless communications system 100. Usually, in a homogeneous wireless communications system, such as a cellular communications system, enhanced NodeB (eNB)/base station (BS)/access point (AP), also commonly referred to as a macro cell, may be connected to a core network and the eNBs/BSs may directly serve terminals (also commonly referred to as user equipment (UE), mobile station (MS), user, and so on). In a HET-NET, within a coverage area of a macro cell, there may be one more additional cells with lower transmission power (also referred to as low power nodes (LPN)) that may be used to enhance wireless communications system performance. Examples of LPNs may include relay nodes, micro cells, pico cells, and so forth.

Although the LPNs and the macro cells may be viewed as two different network layers and may be capable of operating relatively independently of one another, tight coordination is necessary due to the fact that the coverage areas of macro cells usually overlaps the coverage areas of the LPNs. A macro subnet may be defined as a collection of nodes that includes a macro cell and a number of LPNs which are geographically close to the macro cell or is located within a coverage area of the macro cell. Furthermore, the macro cell controls all of the management functionalities of the macro subnet. The macro cell may be referred to as, a macro subnet controller (MSC). In a macro subnet with relay nodes, the macro subnet controller may be a donor eNB (DeNB) since the DeNB donates a portion of its bandwidth to the relay nodes.

As shown in FIG. 1a, wireless communications system 100 includes a core network 105. Core network 105 may be a central part of wireless communications system 100 and may be a wireline network that is used by an operator of wireless communications system 100 to provide various services to subscribers. For example, core network 105 may be used to route connections between network entities that are not directly connected to one another.

Coupled to core network 105 may be macro subnet controllers, which according to an embodiment may be eNB or DeNB, such as MSC 110, and MSC 111. In the 3GPP LTE technical standards, eNBs are communications controllers that are responsible for controlling the communications of communications devices (including UE) that they serve. In other technical standards, eNBs may be referred by different names, such as base stations, base terminal stations, communications controller, access point, and so forth. If wireless communications system 100 is viewed as a hierarchical structure, core network 105 may be at a top layer, and the macro subnets (including the macro subnet controllers and the LPNs) may be at a layer, referred to as a macro subnet layer, immediately below the top layer (core network 105).

As examples, MSC 110 and LPN group 115 (including pico cell 120, and relay nodes 125 and 126) may form a first macro subnet, and MSC 111 and LPN group 116 may form a second macro subnet.

Below the macro subnet layer may be multiple micro subnets. A micro subnet may be defined as a LPN within a macro subnet that controls/manages a smaller group of LPNs within the macro subnet. For example, pico cell 120 may control a number of other LPNs that are not shown in FIG. 1a, thereby forming a micro subnet. The multiple micro subnets may form a macro subnet layer.

The layer below the micro subnet layer may be referred to as a communications device layer. In addition to the UE served by the pico cells and the relay nodes, the communications device layer may include UE that are directly served by the eNBs. For example, a portion of the communications device layer corresponding to LPN group 115 may include UE served by RNs 125 and 126, PC 120, as well as eNB 110.

Figure 1B:
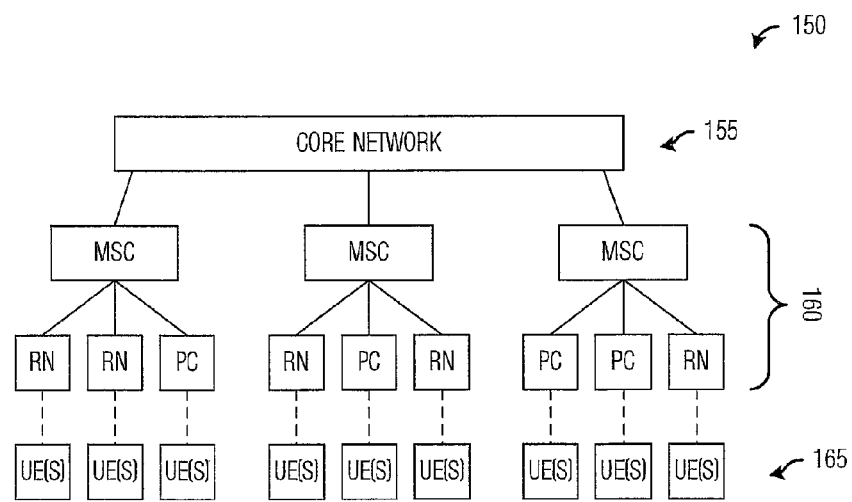
FIG. 1b is a diagram of a graphical view of a wireless communications system.

FIG. 1b illustrates a graphical view of a wireless communications system 150. At the top of wireless communications system 150 may be a core network 155, which may not be considered as being part of the wireless portion of wireless communications system. Below core network 155 is a macro subnet layer 160 comprised of MSCs (eNBs and/or DeNBs in a 3GPP LTE compliant wireless communications system) and LPNs. A communications device layer 165 includes UE served by the members of macro subnet layer 160.

Figure 2:
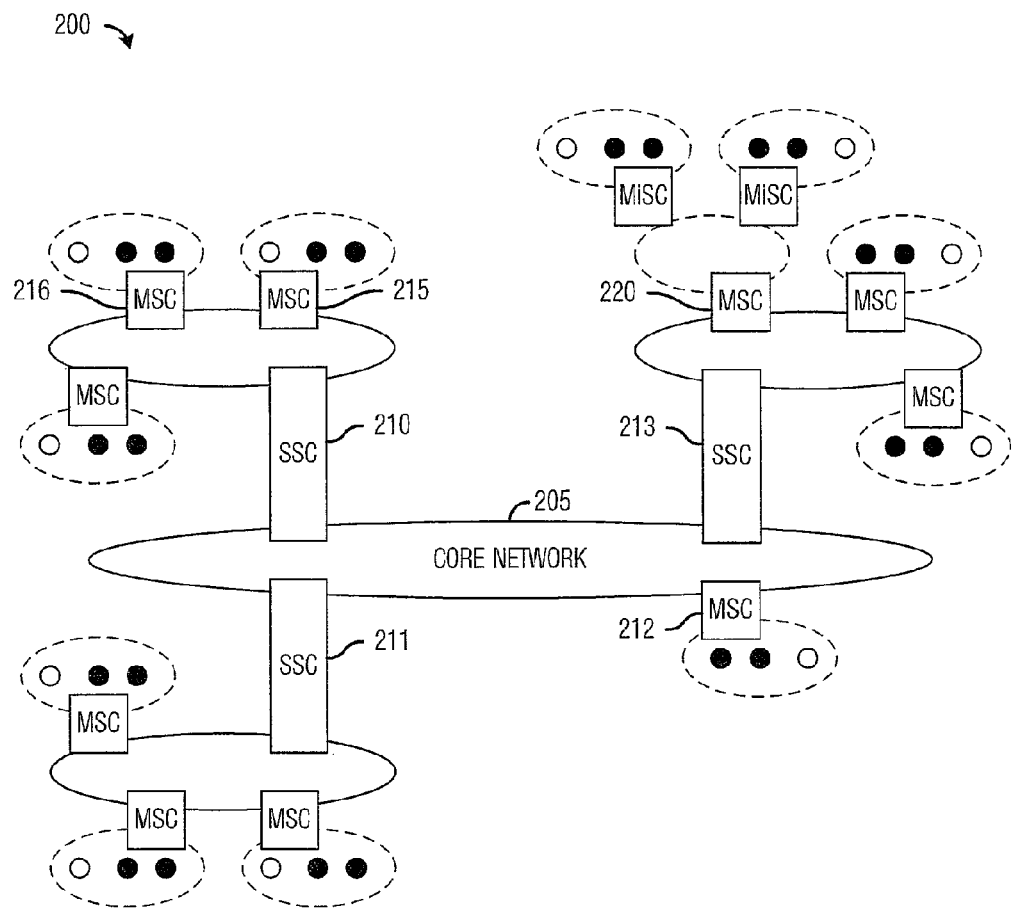
FIG. 2 is a diagram of a wireless communications system, wherein wireless communications system includes multiple controller layers.

FIG. 2 illustrates a wireless communications system 200, wherein wireless communications system 200 includes multiple controller layers. Comparing wireless communications system 200 to wireless communications system 100, wireless communications system 200 includes multiple layers of subnets. As an example, an eNB may manage and coordinate the operation of multiple macro subnets, including multiple macro subnet controllers at different levels. A subnet with such a configuration may be referred to as a super subnet. As shown in FIG. 2, controllers, such as super subnet controller (SSC) 210, SSC 211, and SSC 213 are part of super subnets. As an example, SSC 210 manages and coordinates MSC 215, MSC 216, as well as other MSCS, while SSC 213 manages and coordinates a number of MSCs, with MSC 220 also managing and coordinating a number of micro subnet controllers (MiSC) on its own. A macro subnet managed and coordinated by MSC 212 is also illustrated. The subnet configuration shown in FIG. 2 may be an example of a wide range of possible subnet configurations in a wireless communications system.

In general, each MSC in a subnet controller layer may control a plurality of MSCs in a lower subnet controller layer. Although FIG. 2 as having two or three subnet controller layers, there may be no physical limitations on the number of subnet controller layers in a super subnet. However, practical considerations may limit the number of subnet controller layers in a super subnet to one, two, three, or four subnet controller layers.

As shown in FIG. 2, a wireless communications system may have different numbers of subnet controller layers in each of its super subnets.

The hierarchical structure for a wireless communications system shown in FIGS. 1a, 1b, and 2 may help to reduce complexity typically associated with a multi-layer communications system. The hierarchical structure also helps to optimize performance. As an example, the eNBs as subnet controllers and relay nodes associated with the eNBs may be considered to be part of a macro subnet, where the eNBs perform macro subnet controller functionality. Herein, the discussion will focus on 3GPP LTE compliant wireless communications systems, therefore, eNBs and DeNBs will be used in reference to MSCs. However, the use of eNBs and DeNBs should not be construed as being limiting to either the scope or the spirit of the embodiments.

Alternatively, multiple eNBs along with relay nodes associated with the multiple eNBs (multiple subnet controller layers) may be considered to be part of a super subnet, with controllers (eNBs) at each layer performing controller functionality and higher layer controllers controlling lower layer controllers. Within a macro subnet, there may be one or more micro subnets, with each micro subnet controller performing micro subnet controller functionality.

In a macro subnet, an eNB assumes control and/or management functionality of the macro subnet. The eNB also assumes control of the topology of the macro subnet domain, while a core network manages the topology of the core network domain.

As an example, in a 3GPP LTE compliant wireless communications system, a core network of cellular access network may remain unaffected in the hierarchical structure. A mobility management entity (MME) may be used to manage a UE's attachment to the eNB. However, due to the hierarchical structure, UE mobility that remains within a macro subnet is invisible to the core network. A relay MME (R-MME) may manage an attachment of a mobile relay node to the eNB, while a packet data gateway (PGW) may control a delivery of data (UE data) to the eNB. Furthermore, as shown previously, a macro subnet may include an eNB and associated relay nodes as well as pico cells.

As its name implies, a macro subnet controller, e.g., an eNB or DeNB in a 3GPP LTE compliant wireless communications system, may be responsible for managing a macro subnet. As discussed previously, examples of a subnet may include a super subnet (a macro subnet with more than one layer of subnet controllers, such as shown in FIG. 2), a macro subnet (a macro subnet with a single layer of subnet controllers, such as shown FIG. 1a), and a micro subnet (a subnet within a macro subnet, such as shown in FIG. 1a). Management of a macro subnet may include: macro subnet topology management, such as topology population as well as managing UE attachment, which is a subset of MME functionality; macro subnet connection management where the macro subnet controller may assign identities to local traffic/UE, where the identities need to be unique only within the macro subnet; macro subnet UE data delivery management where quality of service (QoS) restrictions are imposed by performing traffic filtering, for example, and load management is performed; node coordination manager for purposes of performance optimization; and macro subnet security agent where access to a core network and/or a forwarding of secured data using wireless network security (e.g., packet data convergence protocol (PDCP) in 3GPP LTE or Internet Protocol security (IPsec) like security in a wireless network internet protocol (WN-IP) layer) is controlled by the macro subnet controller.

Management of a macro subnet may further include: OAM agent where subnet OAM functionality may include maintaining a local performance log and/or performing local configuration, serving as an agent of an operator's OAM (enabling to known configuration); UE mobility management where handoffs that remain within the macro subnet are handled by the macro subnet controller and not propagated up to the MME; and not serving as agent of vendor's OAM; data gateway (GW) agent performing dynamic routing of traffic; and macro subnet interference management with co-channels, for example, determining intercell interference cancellation (ICIC) parameters and/or power level settings.

Figure 3:
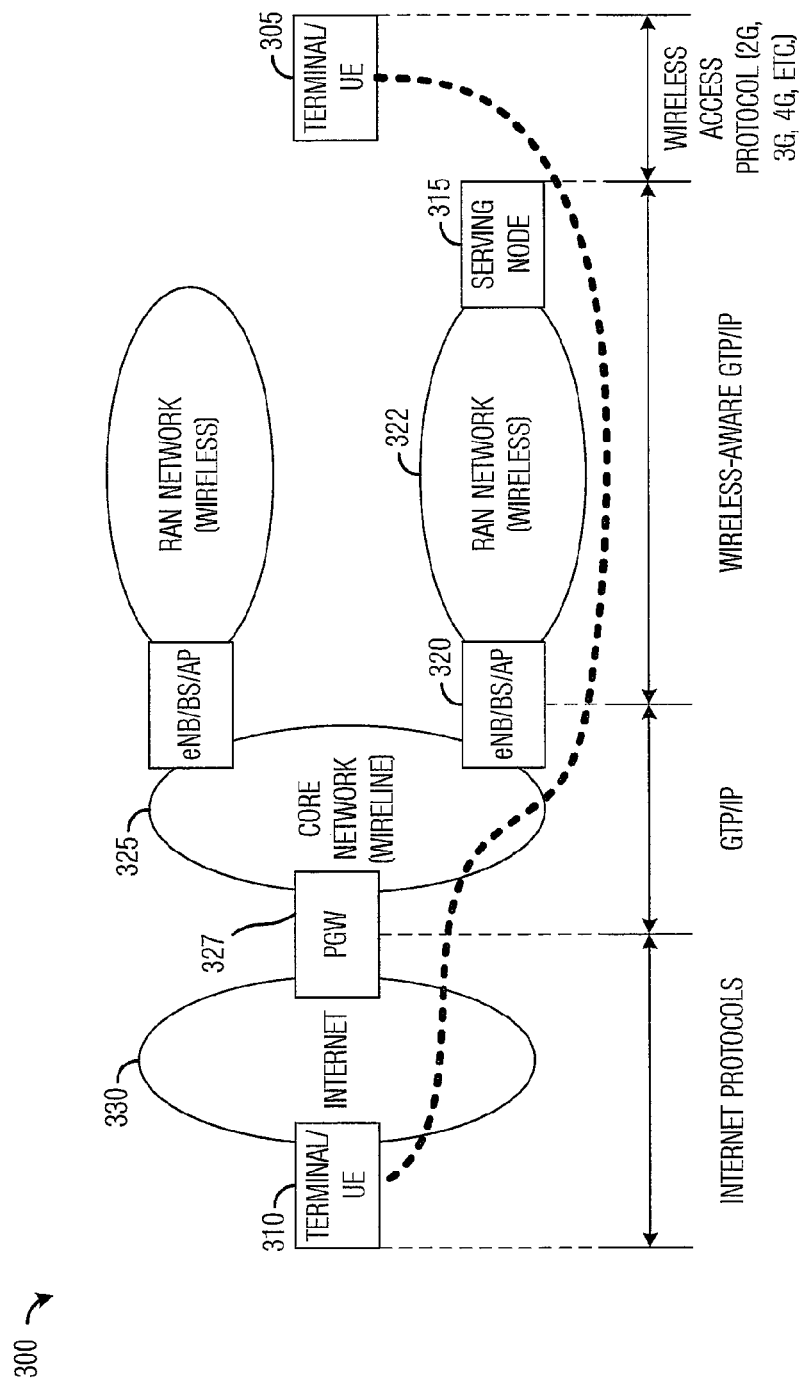
FIG. 3 is a diagram of a wireless communications system.

FIG. 3 illustrates a wireless communications system 300. Wireless communications system 300 illustrates a connection between a first terminal/UE 305 to a second terminal/UE 310 and intermediary communications system components involved in the connection. FIG. 3 highlights an extension to a current core network structure used in 3GPP LTE technical standards.

Wireless communications system 300 makes use of general packet radio service (GPRS) tunneling protocol/internet protocol (GTP/IP) in a core network for QoS management, for example, and IP for routing. Wireless communications system 300 includes terminal/UE 305 wirelessly connected (for example, the wireless connection may be a 2G, 3G, 4G, or so on, wireless access protocol) to a serving node 315. Serving node 315 may be an eNB, a relay node, a pico cell, a femto cell, or so on. Serving node 315 may be wirelessly connected (for example, the wireless connection may be a wireless-aware GTP/IP protocol) over a radio access network (RAN) 322 to an eNB/base station (BS)/access point (AP) 320. eNB/BS/AP 320 may be a macro subnet controller as described previously. eNB/BS/AP 320 may be connected over a wireline core network 325 to a packet gateway (PGW) 327, which may be connected to terminal/UE 310 over the Internet 330. Wireline core network 325 may utilize a GTP/IP protocol to implement QoS restrictions, among other things, while a variety of internet protocols may be used to deliver information over the Internet 330.

Generally, within wireless communications system 300, there may be multiple distinct parts and within each part, a communications protocol of some form is utilized to transmit information. For example, any of a variety of internet protocols may be used to transmit information between terminal/UE 310 to PGW 327, while GTP/IP may be used to transmit information in core network 325, and a wireless access protocol (WAP) may be used to transmit information between serving node 315 and terminal/UE 305. In RAN 322, it may be possible to extend existing standard internet protocols to transmit information between eNB/BS/AP 320 and serving node 315.

However, existing standard internet protocols are designed for wireline transmissions and may be inefficient for wireless transmissions wherein less bandwidth is available. Furthermore, extensions to RAN 322 may include the use of relay nodes. The use of relay nodes may add at least one additional transmission to existing communications paths. Therefore, an already inefficient standard internet protocol may introduce further overhead to wireless communications and negatively impact wireless communications system performance. Therefore, there is a need to design communications protocols that reduce communications overhead in a wireless communications system.

Figure 4:
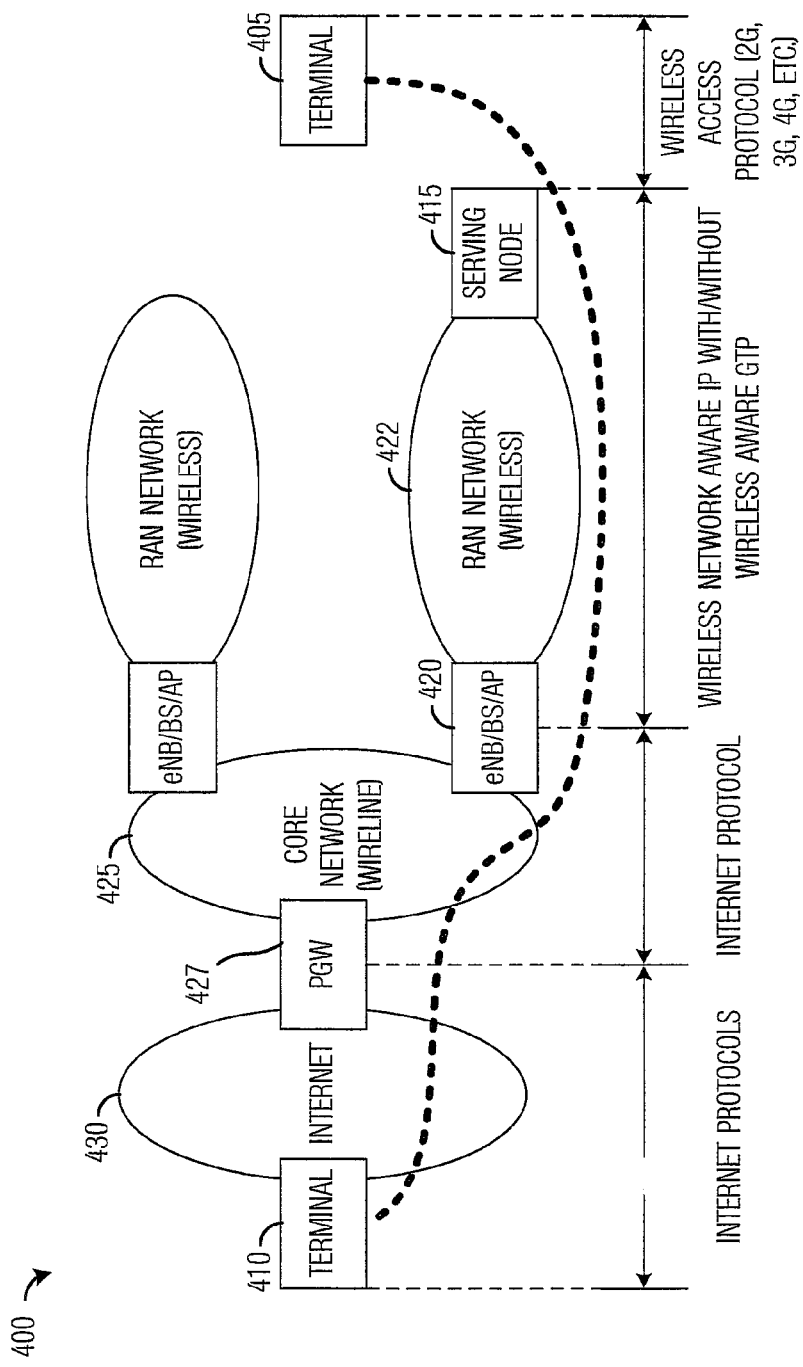
FIG. 4 is a diagram of a wireless communications system, wherein a pure IP network with mobility management is used.

FIG. 4 illustrates a wireless communications system 400, wherein a pure IP network with mobility management is used. Wireless communications system 400 illustrates a connection between a first terminal/UE 405 to a second terminal/UE 410 and intermediary communications system components involved in the connection. FIG. 4 highlights an extension to a current core network structure used in 3GPP LTE technical standards. Wireless communications system 400 makes use of a pure IP core network with mobility management. Wireless communications 400 is different from wireless communications system 300 in that it includes a core network that uses internet protocols. Therefore, a wireless network-aware protocol will interface with an internet protocol.

Wireless communications system 400 includes terminal/UE 405 wirelessly connected (for example, the wireless connection may be a 2G, 3G, 4G, or so on wireless access protocol) to a serving node 415. Serving node 415 may be an eNB, a relay node, a pico cell, a femto cell, or so on. Serving node 415 may be wirelessly connected (for example, the wireless connection may be a wireless network-aware IP protocol with or without wireless-aware GTP) over a radio access network (RAN) 422 to an eNB/base station (BS)/access point (AP) 420. eNB/BS/AP 420 may be a macro subnet controller as described previously. eNB/BS/AP 420 may be connected over a wireline core network 425 to a packet gateway (PGW) 427, which may be connected to terminal/UE 410 over the Internet 430. Wireline core network 425 may utilize an IP protocol to communicate, while a variety of internet protocols may be used to deliver information over the Internet 430. Wireline core network 425 may perform wireless network (over wireline core network 425 and RAN 422) QoS management, where the QoS management may include a Layer 3 QoS mechanism, such as a Diffserv code point DSCP field extension. Wireline core network 425 may also perform mobility management.

It may be possible to use a wireline internet protocol in a wireless portion of a wireless communications system, such as in 3GPP LTE Release 10. However, the direct use of a wireline internet protocol in a wireless portion of a wireless communications system may not provide optimum performance. As an example, transmission control protocol/internet protocol (TCP/IP) as well as other wireline internet protocols have high protocol overhead. The high protocol overhead may be acceptable in a wireline communications system where there are very large amounts of bandwidth. However, in a wireless portion of a wireless communications system, where bandwidth may be limited as well as expensive, high overhead may be costly and should be avoided as much as possible.

Furthermore, IP protocol has an addressing scheme that uses an identifier that universally identifies network entities. Universal identification requires that the addresses are long. However, universal identification is not necessary in a relatively small coverage area, such as in a subnet, e.g., a macro subnet, a super subnet, a pico subnet, or so on.

Additionally, a node, such as a router, and so forth, in a wireline communications system usually assumes full functionality since complexity and power consumption is typically not a limiting factor. However, in a wireless portion of a wireless communications system, nodes may battery power for normal operation. Therefore, complexity and power consumption may be a critical concern.

Figure 5:
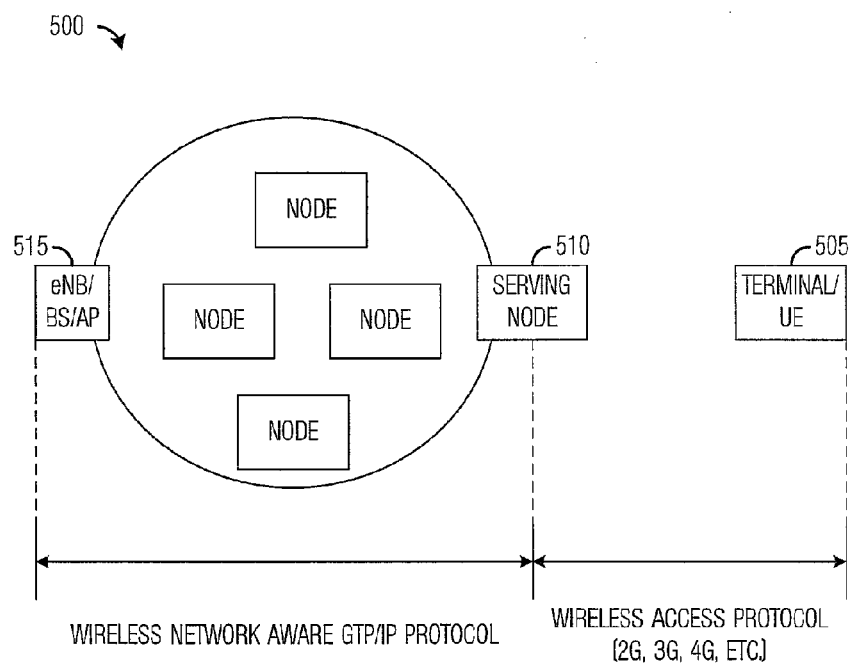
FIG. 5 is a diagram of a portion of a wireless communications system, where a wireless-aware protocol is implemented in a wireless portion of wireless communications system.

FIG. 5 illustrates a portion of a wireless communications system 500, where a wireless-aware protocol is implemented in a wireless portion of wireless communications system 500. As shown in FIG. 5, a wireless portion of wireless communications system 500 is illustrated. The wireless portion may be representative of a macro subnet in wireless communications system 500.

A connection between terminal/UE 505 and its serving node 510 may remain wireless over a 2G, 3G, 4G, or so forth, wireless access protocol as previously discussed. However, a connection between serving node 510 and eNB/BS/AP 515 may change from a standard wireline internet protocol over RAN to a wireless-aware GTP/IP protocol or a wireless network-aware IP protocol with or without wireless-aware GTP. Also, a connection between eNB/BS/AP 515 and serving node 510 may occur over multiple routes and multiple hops.

As discussed previously, the use of a wireless-aware GTP/IP protocol or wireless network-aware IP protocol with or without wireless-aware GTP may help reduce communications overhead, use a simpler addressing scheme that provides locally (within a macro subnet, for example) unique identification but not globally unique identification, and moves functionality to a macro subnet controller (e.g., eNB/BS/AP 515).

A wireless-aware GTP/IP (WN-TP) protocol may be capable of ensuring in-order delivery of packets as well as identifying a service packet flow (service flow) after classification of IP traffic. A header in the wireless-aware GTP/IP protocol may include a total length field (e.g., 16 bits long), a sequence field (e.g., 16 bits long), and a service flow identifier field (e.g., 16 bits long) to replace a 32 bits long tunnel endpoint identifier field. Therefore, headers in the wireless network-aware GTP/IP protocol are at least two bytes shorter than GTP-U headers.

A wireless network-aware IP (WN-IP) protocol may be capable of ensuring QoS based delivery, performing payload fragmentation (which is not needed if packet fragmentation is performed in a radio link control (RLC) layer), performing payload packing (which is not needed if packet fragmentation is performed in the RLC layer), connectionless data delivery, and so forth. A header in the wireless network-aware IP protocol may include a wireless network QoS field (e.g., 6 to 8 bits long, similar to a 3GPP LTE QCI field), a total payload length field (e.g., 16 bits long), a destination node identifier (e.g., 8 to 12 bits long), a source node identifier (e.g., 8 to 12 bits long), a check sum field (e.g., 8 bits long). If packet fragmentation is implemented, then the header may also include a sequence field (e.g., 16 bits long), a flag field (e.g., 2 bits long), a fragment offset field (e.g., 13 bits), a fragmentation control field (e.g., 2 bits long, similar to a 3GPP LTE Frame Info field), and for a packing case, one length field for each service data unit (SDU). Therefore, without fragmentation/packing, the headers are about 10 bytes in size.

A wireless network-aware PDCP (WN-PDCP) protocol may be capable of mapping individual flow tunnels with same QoS class identifier (QCI) and the same or different relay node (serving node) identifier onto a single radio bearer, with all per flow packets being viewed as a single aggregated flow. Header information for use by the WN-PDCP protocol may include security information and suppression information.

A wireless network-aware RLC (WN-RLC) (ARQ) protocol may be capable of using a packet's identifier and offset information to uniquely identify a fragment of an aggregated PDCP PDU flow. Header information for use by the WN-RLC protocol may include packet identifier, fragment offset, and length.

Figure 6:
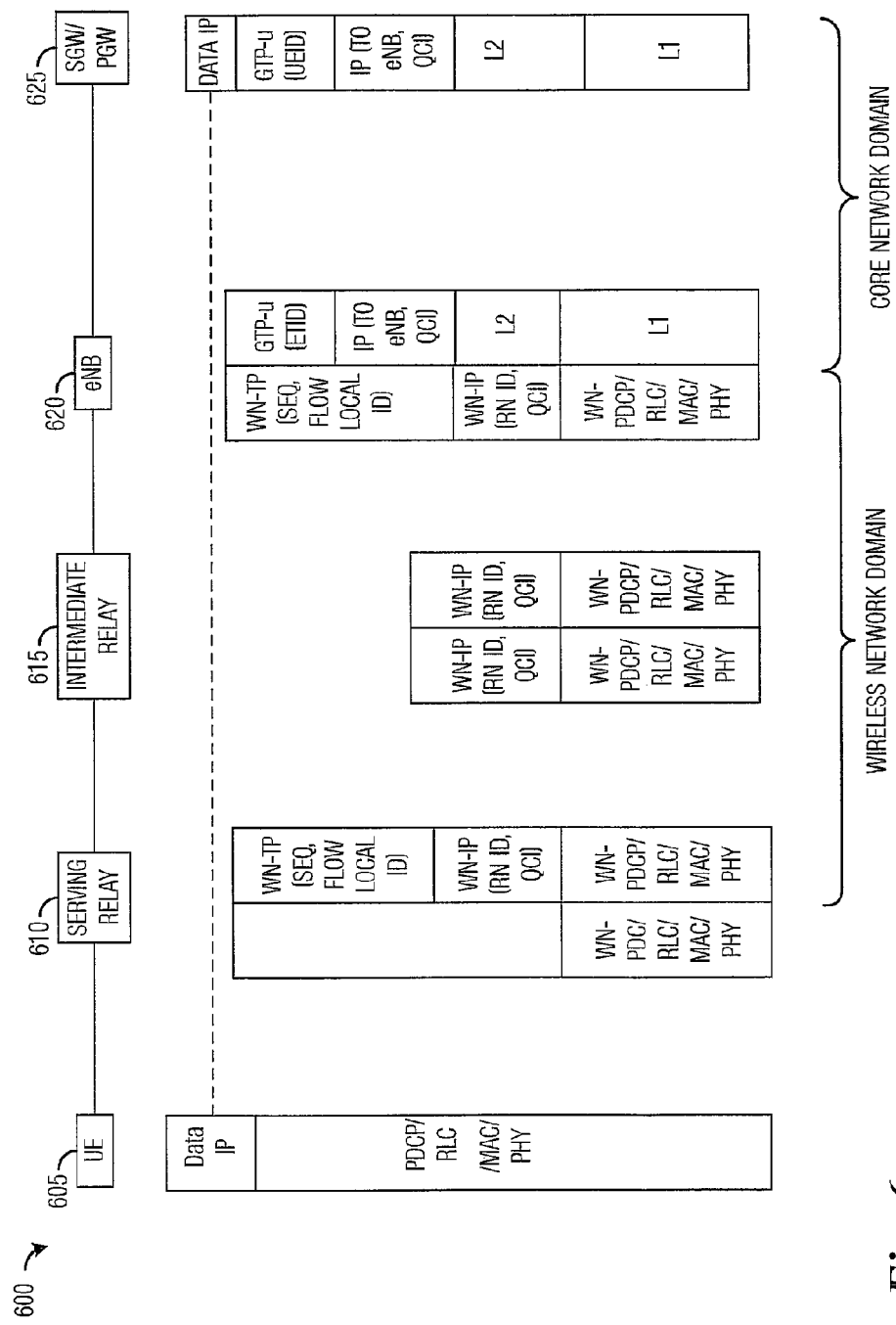
FIG. 6 is a diagram of a wireless communications system, highlighting protocol stacks used in wireless communications system, and wherein a first embodiment of a wireless network-aware protocol is shown.

FIG. 6 illustrates a wireless communications system 600, highlighting protocol stacks used in wireless communications system 600, and wherein a first embodiment of a wireless network-aware protocol is shown. A portion of wireless communications system 600 from a UE 605 to a core network is detailed, including portions of a wireless network domain and a core network domain. Other network components detailed include a serving relay node 610, an intermediate relay node 615, an eNB 620 (serving as a macro subnet controller), and a serving gateway/packet gateway (SGW/PGW) 625 (which may be an entry point to the core network).

As shown in FIG. 6, IP packets are exchanged between UE 605 and SGW/PGW 625 at a DATA IP layer level. Information originating from UE 605 may first arrive at serving relay node 610 over a wireless access protocol. The information from UE 605 travels down a protocol stack of UE 605, through a DATA IP layer and then through PDCP, RLC, MAC, and PHY layers and enters at serving relay node 610 and goes up through PHY, MAC, RLC, and WN-PDCP layers.

With the information going through intermediate relay node 615, the information may travel from serving relay node 610 to eNB 620 through a tunnel by traversing down a protocol stack of serving relay node 610 (through wireless network-aware tunneling protocol (WN-TP), WN-IP, WN-PDCP, RLC, MAC, and PHY layers) to intermediate relay node 615, where it travels through PHY, MAC, RLC, WN-PDCP, and WN-IP layers. A protocol stack of intermediate relay node 615 does not need to implement a WN-TP layer. From intermediate relay node 615, the information may move to eNB 620 by traveling down WN-IP, WN-PDCP, RLC, MAC, and PHY layers and then it travels up through PHY, MAC, RLC, WN-PDCP, WN-IP, and WN-TP layers of a protocol stack of eNB 620.

From eNB 620, the information may arrive at SGW/PGW 625 over a wireline connection, traveling down GTP-u and IP layers, Layer 2, and Layer 1 of a protocol stack of eNB 620 and up Layer 1, Layer 2, IP, and GTP-u layers of SGW/PGW 625.

First embodiment of wireless network-aware protocol enables connectionless data delivery (routing) with WN-TP and WN-IP layers positioned above WN-PDCP and RLC layers, thereby allowing the use of conventional RLC techniques. Aggregate user service flows with similar QoS restrictions may travel over the same or different paths. Backhaul connection (from serving relay node 610 to eNB 620, for example) is kept in WN-TP layer.

Figure 7:
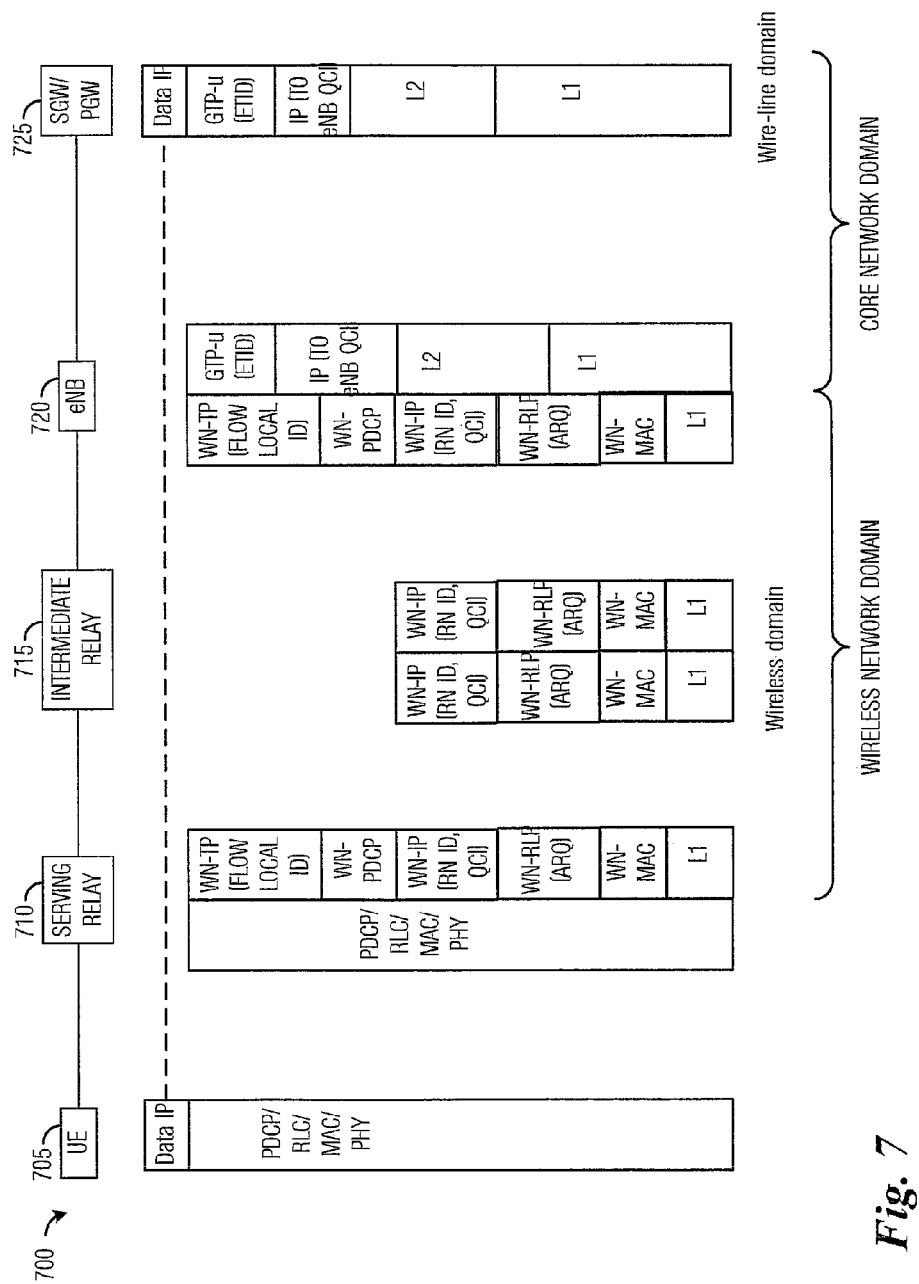
FIG. 7 is a diagram of a wireless communications system, highlighting protocol stacks used in wireless communications system, and wherein a second embodiment of a wireless aware protocol is shown.

Advantages of first embodiment of wireless network-aware protocol include: a lower overhead is achieved by implementing wireless network-aware TP and IP protocols; flexible and/or dynamic routing is provided; and scalability of PDCP/radio link protocol (RLP) entities is possible FIG. 7 illustrates a wireless communications system 700, highlighting protocol stacks used in wireless communications system 700, and wherein a second embodiment of a wireless aware protocol is shown. A portion of wireless communications system 700 from a UE 705 to a core network is detailed, including portions of a wireless network domain and a core network domain. Other network components detailed include a serving relay node 710, an intermediate relay node 715, an eNB 720 (serving as a macro subnet controller), and a serving gateway/packet gateway (SGW/PGW) 725 (which may be an entry point to the core network).

As shown in FIG. 7, IP packets are exchanged between UE 705 and SGW/PGW 725 at a DATA IP layer level. Information originating from UE 705 may first arrive at serving relay node 710 over a wireless access protocol. The information from UE 705 travels down a protocol stack of UE 705, through a DATA IP layer and then through PDCP, RLC, MAC, and PHY layers and enters at serving relay node 710 and goes up through PHY, MAC, RLC, and PDCP layers.

With the information going through intermediate relay node 715, the information may travel from serving relay node 710 to eNB 720 through a tunnel by traversing down a protocol stack of serving relay node 710 (through WN-TP, WN-PDCP, WN-IP, WN-RLP, WN-MAC, and Layer 1 layers) to intermediate relay node 715, where it travels through Layer 1, WN-MAC, WN-RLP, and WN-IP layers. A protocol stack of intermediate relay node 715 does not need to implement WN-PDCP and WN-TP layers. From intermediate relay node 715, the information may move to eNB 720 by traveling down WN-IP, WN-RLP, WN-MAC, and Layer 1 layers and then it travels up Layer 1, WN-MAC, WN-RLP, WN-IP, WN-PDCP, and WN-TP layers of a protocol stack of eNB 720.

From eNB 720, the information may arrive at SGW/PGW 725 over a wireline connection, traveling down GTP-u and IP layers, Layer 2, and Layer 1 of a protocol stack of eNB 720 and up Layer 1, Layer 2, IP, and GTP-u layers of SGW/PGW 725.

Second embodiment of wireless network-aware protocol enables connectionless data delivery (routing) with WN-TP above WN-PDCP but with WN-IP in between WN-PDCP and WN-RLP. Aggregate user service flows with similar QoS are provided, along with end-to-end security and/or suppression. Backhaul connection (from serving relay node 710 to eNB 720, for example) is kept in WN-TP layer. There is no support for conventional logical channel identifiers (LCID) in WN-MAC.

Advantages of second embodiment of wireless network-aware protocol include: a lower overhead is achieved by implementing wireless network-aware TP and IP protocols; flexible and/or dynamic routing is provided; end-to-end (between serving relay node and eNB) security and/or suppression is possible; and scalability is not limited.

Figure 8:
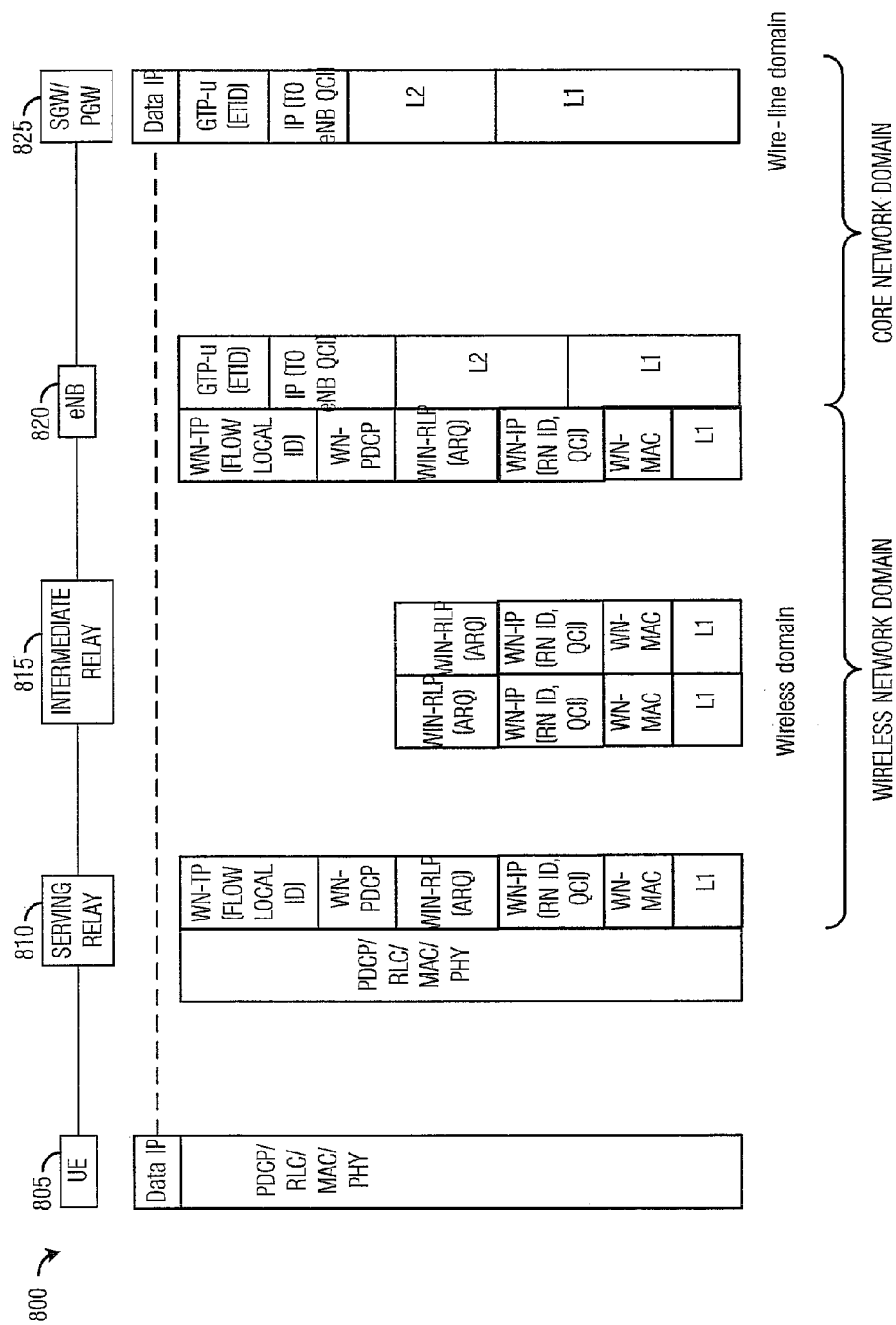
FIG. 8 is a diagram of a wireless communications system, highlighting protocol stacks used in wireless communications system, and wherein a third embodiment of a wireless aware protocol is shown.

FIG. 8 illustrates a wireless communications system 800, highlighting protocol stacks used in wireless communications system 800, and wherein a third embodiment of a wireless aware protocol is shown. A portion of wireless communications system 800 from a UE 805 to a core network is detailed, including portions of a wireless network domain and a core network domain. Other network components detailed include a serving relay node 810, an intermediate relay node 815, an eNB 820 (serving as a macro subnet controller), and a serving gateway/packet gateway (SGW/PGW) 825 (which may be an entry point to the core network).

As shown in FIG. 8, IP packets are exchanged between UE 805 and SGW/PGW 825 at a DATA IP layer level. Information originating from UE 805 may first arrive at serving relay node 810 over a wireless access protocol. The information from UE 805 travels down a protocol stack of UE 805, through a DATA IP layer and then through PDCP, RLC, MAC, and PHY layers and enters at serving relay node 810 and goes up through PHY, MAC, RLC, and PDCP layers.

With the information going through intermediate relay node 815, the information may travel from serving relay node 810 to eNB 820 through a tunnel by traversing down a protocol stack of serving relay node 810 (through WN-TP, WN-PDCP, WN-RLP, WN-IP, WN-MAC, and Layer 1 layers) to intermediate relay node 815, where it travels through Layer 1, WN MAC, WN-IP, and WN-RLP layers. A protocol stack of intermediate relay node 815 does not need to implement WN-PDCP and WN-TP layers. From intermediate relay node 815, the information may move to eNB 820 by traveling down WN-RLP, WN-IP, WN-MAC, and Layer 1 layers and then up Layer 1, WN-MAC, WN-IP, WN-RLP, WN-PDCP, and WN-TP layers of a protocol stack of eNB 820.

From eNB 820, the information may arrive at SGW/PGW 825 over a wireline connection, traveling down GTP-u and IP layers, Layer 2, and Layer 1 of a protocol stack of eNB 820 and up Layer 1, Layer 2, IP, and GTP-u layers of SGW/PGW 825.

Third embodiment of wireless network-aware protocol enables connectionless data delivery (routing) with WN-TP above WN-PDCP and WN-RLP, but WN-IP is below WN-PDCP and WN-RLP. Aggregate user service flows with similar QoS and the same path are provided, along with end-to-end security and/or suppression. Backhaul connection (from serving relay node 810 to eNB 820, for example) is kept in WN-TP layer.

Advantages of third embodiment of wireless network-aware protocol include: a lower overhead is achieved by implementing wireless network-aware TP and IP protocols; flexible and/or dynamic routing is provided; end-to-end (between serving relay node and eNB) security and/or suppression and/or ARQ is possible; intermediate relay node simplicity is maintained (only includes WN-MAC, WN-IP, and WN-RLP layers, not involved with UE security information); consecutive fragmentation forwarding is enabled without having to wait for reception of an entire packet, thereby reducing delay.

Figure 9:
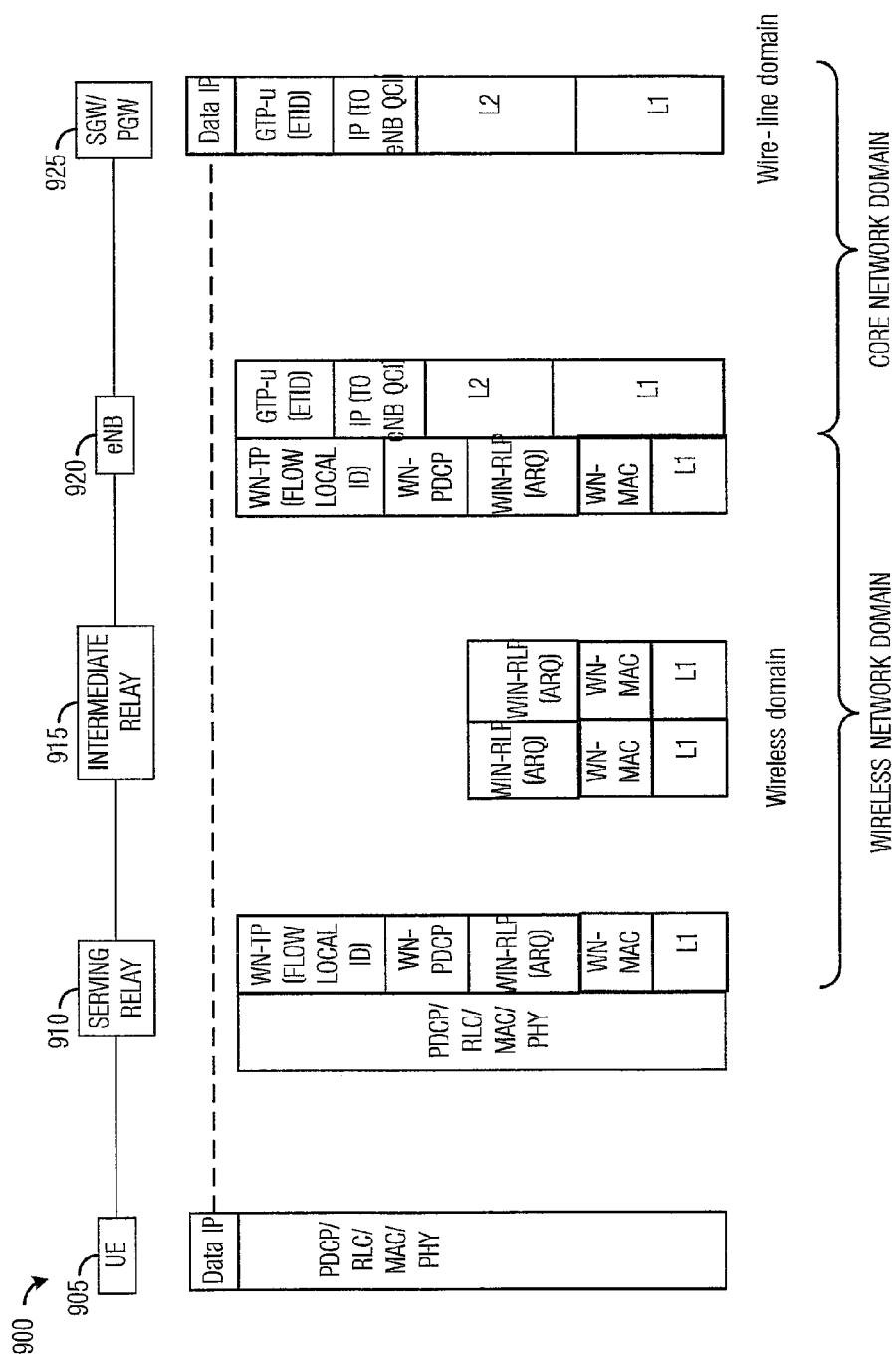
FIG. 9 is a diagram of a wireless communications system, highlighting protocol stacks used in wireless communications system, and wherein a fourth embodiment of a wireless aware protocol is shown.

FIG. 9 illustrates a wireless communications system 900, highlighting protocol stacks used in wireless communications system 900, and wherein a fourth embodiment of a wireless aware protocol is shown. A portion of wireless communications system 900 from a UE 905 to a core network is detailed, including portions of a wireless network domain and a core network domain. Other network components detailed include a serving relay node 910, an intermediate relay node 915, an eNB 920 (serving as a macro subnet controller), and a serving gateway/packet gateway (SGW/PGW) 925 (which may be an entry point to the core network).

As shown in FIG. 9, IP packets are exchanged between UE 905 and SGW/PGW 925 at a DATA IP layer level. Information originating from UE 905 may first arrive at serving relay node 910 over a wireless access protocol. The information from UE 905 travels down a protocol stack of UE 905, through a DATA IP layer and then through PDCP, RLC, MAC, and PHY layers and enters at serving relay node 910 and goes up through PHY, MAC, RLC, and PDCP layers.

With the information going through intermediate relay node 915, the information may travel from serving relay node 910 to eNB 920 through a tunnel by traversing down a protocol stack of serving relay node 910 (through WN-TP, WN-PDCP, WN-RLP, WN-MAC, and Layer 1 layers) to intermediate relay node 915, where it travels through Layer 1, WN-MAC, and WN-RLP layers. A protocol stack of intermediate relay node 915 does not need to implement WN-PDCP and WN-TP layers. From intermediate relay node 915, the information may move to eNB 920 by traveling down WN-RLP, WN-MAC, and Layer 1 layers and then it travels up through Layer 1, WN-MAC, WN-RLP, WN-PDCP, and WN-TP layers of a protocol stack of eNB 920.

From eNB 920, the information may arrive at SGW/PGW 925 over a wireline connection, traveling down GTP-u and IP layers, Layer 2, and Layer 1 of a protocol stack of eNB 920 and up Layer 1, Layer 2, IP, and GTP-u layers of SGW/PGW 925.

Fourth embodiment of wireless network-aware protocol enables circuit and/or connection oriented data delivery (circuit switching) with WN-TP above WN-PDCP and WN-RLP without requiring a WN-IP layer. Aggregate user service flows with similar QoS and the same path are provided. Backhaul connection (from serving relay node 910 to eNB 920, for example) is kept in WN-TP.

Advantages of fourth embodiment of wireless network-aware protocol include: a lower overhead is achieved by implementing wireless network-aware TP and IP protocols; flexible and/or dynamic routing is provided; end-to-end (between serving relay node and eNB) security and/or suppression and/or ARQ is possible; intermediate relay node simplicity is maintained (only includes WN-MAC and WN-RLP layers, not involved with UE security information); consecutive fragmentation forwarding is enabled without having to wait for reception of an entire packet, thereby reducing delay.

For the embodiments of wireless network-aware protocol discussed above, the interface between UE and serving relay node assumptions are consistent with assumptions specified in 3GPP LTE technical standards. However, the serving relay node may assume a subset of protocol layers as shown, depending on a user protocol stack. For a control plane, control message for management of per-hop communications may perform per-hop security (instead of end-to-end security).

Figure 10:
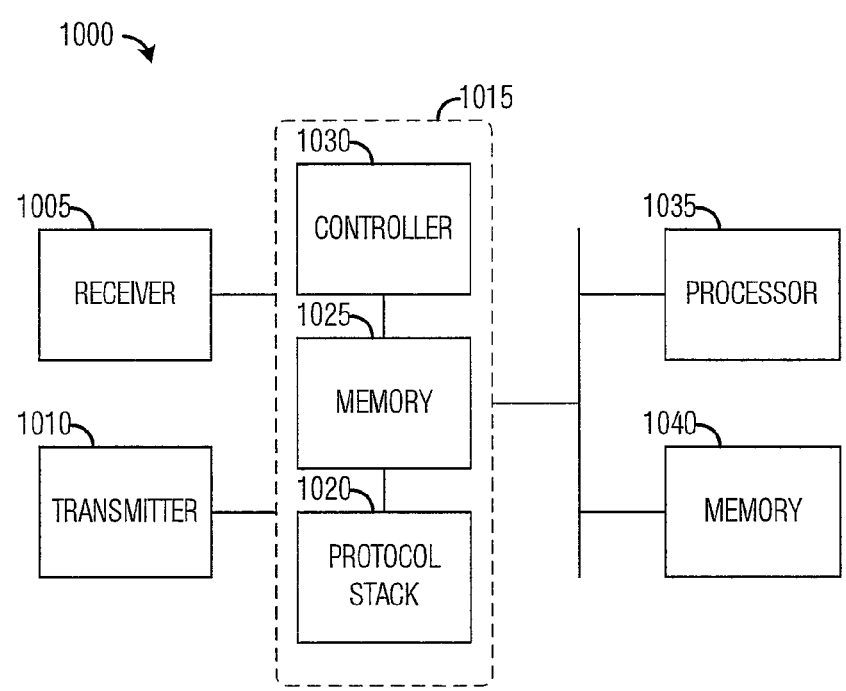
FIG. 10 is a diagram of an alternate illustration of a network entity.

FIG. 10 provides an alternate illustration of a network entity 1000. Network entity 1000 may be used to implement various ones of the embodiments discussed herein. For example, network entity 1000 may be an eNB, BS, or AP operating as a macro subnet controller of a wireless communications system. Furthermore more network entity 1000 may be a serving relay node operating in a macro subnet.

As shown in FIG. 10, a receiver 1005 is configured to receive information. A transmitter 1010 is configured to transmit information. Receiver 1005 and transmitter 1010 may wireline, wireless, or wireline and wireless receiver and transmitter. Coupled to receiver 1005 and transmitter 1010 is a communications unit 1015 that is configured to process incoming and outgoing communications for network entity 1000.

Communications unit 1015 includes a protocol stack 1020 that is configured to implement a communications protocol, such as various ones of the embodiments discussed herein. As an example, referencing back to FIG. 6, protocol stack 1020 may include implementations of WN-TP, WN-IP, WN-PDCP, RLC, MAC, PHY, Layer 1, Layer 2, IP, and GTP-u protocols.

Implementations of protocol stack 1020 may include different types and numbers of layers depending on embodiment implemented.

Turning back now to FIG. 10, also included is a memory 1025 that is configured to buffer incoming and outgoing communications as well as to provide scratch memory, program memory, and so forth. A controller 1030 is configured to control the operation of communications unit 1015 as well as execute programs and applications.

A processor 1035 is configured to execute programs and applications that is used to schedule communications, for example. A memory 1040 is configured to store data received from incoming communications or data to be transmitted on outgoing transmissions, scratch memory, program memory, and so on.

The elements of network entity 1000 may be implemented as specific hardware logic blocks. In an alternative, the elements of network entity 1000 may be implemented as software executing in a processor, controller, application specific integrated circuit, or so on. In yet another alternative, the elements of network entity 1000 may be implemented as a combination of software and/or hardware.

As an example, receiver 1005 and transmitter 1010 may be implemented as specific hardware blocks, while communications unit 1015 (including protocol stack 1020 and controller 1030) may be modules executing in a processor, such as processor 1035 or custom compiled logic arrays of field programmable logic arrays. Memory 1025 and memory 1040 may be separate memories or part of a single memory of network entity 1000.

Figure 11:
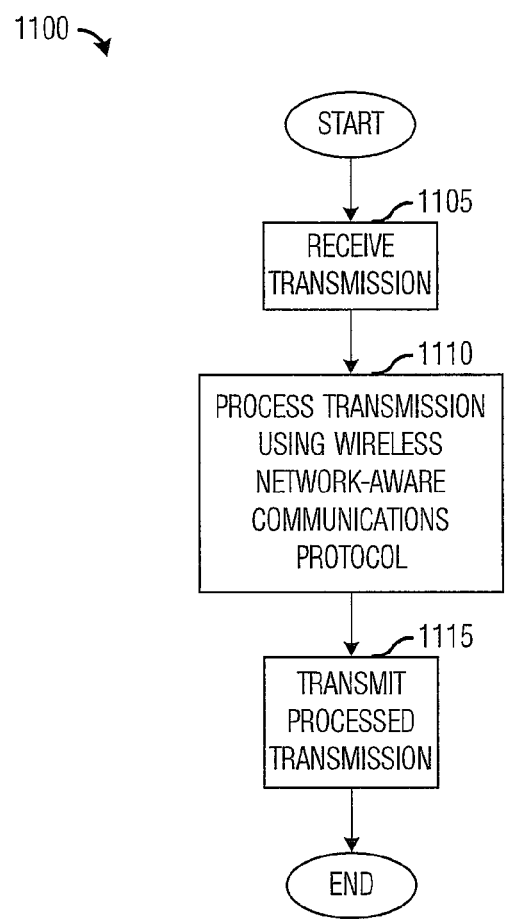
FIG. 11 is a flow diagram of network entity operations.

FIG. 11 illustrates a flow diagram of network entity operations 1100. Network entity operations 1100 may be indicative of operations occurring in a network entity, such as a serving relay node or an intermediate relay node or a macro subnet controller, as it processes transmissions for a wireless portion of a wireless communications system. Network entity operations 1100 may occur while the network entity is in a normal operating mode.

Network entity operations 1100 may begin with the network entity receiving a transmission (block 1105). According to an embodiment, the transmission may be from a communications device in the wireless portion of the wireless communications system or intended for a communications device in the wireless portion of the wireless communications system. The network entity may then process the transmission using a wireless network-aware communications protocol, such as one of the embodiments discussed herein (block 1110). After processing, the network entity may transmit the processed transmission (block 1115) and network entity operations 1100 may then terminate.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A communications system comprising:
   a subnet configured to provide a hierarchical topology for a subset of communications devices in the communications system that are in the subnet; and
   an enhanced NodeB (eNB) coupled to a core network and to the subnet, the eNB configured to:
   execute a wireless network-aware communications protocol comprising a wireless network-aware tunneling protocol (WN-TP) having a header including a service flow non-global local identifier (ID) sufficient for identifying an associated tunnel;
   manage connections of the subset of communications devices in the subnet,
   wherein the subset of communications devices include a serving relay, which serves user equipment, and an intermediate relay coupled between the eNB and the serving relay,
   wherein the eNB and the serving relay utilize the WN-TP above a wireless network-aware radio link control (WN-RLC) protocol,
   wherein the intermediate relay utilizes the WN-RLC protocol, without utilizing the WN-TP for communications between the serving relay and the eNB,
   wherein a first protocol stack comprising the WN-TP of the eNB is different from a second protocol stack comprising the WN-RLC protocol of the intermediate relay, and
   wherein a third protocol stack comprising the WN-TP of the serving relay is different from the second protocol stack comprising the WN-RLC protocol of the intermediate relay;
   manage a network topology of the subnet;
   manage data delivery in and out of the subnet,
   manage a coordination of nodes within the subnet for performance optimization; and
   manage security in the subnet.

2. The communications system of claim 1, wherein the wireless network-aware communications protocol is configured to reduce communications overhead in a wireless portion of the communications system.

3. The communications system of claim 1, wherein the eNB is further configured to act as an operations, administration, and maintenance agent for the subnet, to manage communications device mobility in the subnet, to act as a data gateway agent for the subnet, and to manage interference in the subnet.

4. The communications system of claim 1, wherein the subnet comprises a super subnet controller coupled to the eNB and to at least one node, the super subnet controller configured to manage connections of one communications device of the subset of communications devices coupled to the at least one node.

5. The communications system of claim 4, wherein the subnet comprises a plurality of subnet controllers, with a first subset of the plurality of subnet controllers being coupled to the super subnet controller.

6. The communications system of claim 5, wherein there is a plurality of subsets of the plurality of subnet controllers, and each subset in the plurality of subsets is coupled to a subnet controller in the first subset of the plurality of subnet controllers.

7. An enhanced NobeB (eNB) comprising:
   a receiver configured to receive communications;
   a transmitter configured to transmit communications; and a communications unit coupled to the receiver and the transmitter, and configured to:
utilize a wireless network-aware communications protocol to process communications intended for or received from a communications device coupled to the eNB,
manage connections of a subset of communications devices in a subnet,
manage a network topology of the subnet;
manage data delivery in and out of the subnet,
manage a coordination of nodes within the subnet for performance optimization; and
manage security in the subnet;
wherein the wireless network-aware communications protocol comprises a wireless network-aware tunneling protocol (WN-TP) having a header including a service flow non-global local identifier (ID) sufficient for identifying an associated tunnel,
wherein the wireless network-aware communications protocol provides communication between a serving relay, which serves user equipment, and the eNB via an intermediate relay,
wherein the eNB and the serving relay utilize the WN-TP above a wireless network-aware radio link control (WN-RLC) protocol,
wherein the intermediate relay utilizes the WN-RLC protocol, without utilizing the WN-TP for communications between the serving relay and the eNB,
wherein a first protocol stack of the eNB comprising the WN-TP of the eNB is different from a second protocol stack comprising the WN-RLC protocol of the intermediate relay, and
wherein a third protocol stack of the serving relay comprising the WN-TP of the serving relay is different from the second protocol stack comprising the WN-RLC protocol of the intermediate relay.

8. The eNB of claim 7, wherein the WN-TP is configured to provide in-order delivery of information and service flow identification of the communications intended for or received from the communications device.

9. The eNB of claim 7, wherein the wireless network-aware communications protocol is configured to provide quality of service delivery and connectionless data delivery of the communications intended for or received from the communications device.

10. The eNB of claim 7, wherein the wireless network-aware communications protocol comprises a wireless network-aware packet data convergence protocol configured to provide a mapping of individual flow tunnels with same class identifier and same or different serving node identifier to a single radio bearer of the communications intended for or received from the communications device.

11. The eNB of claim 7, wherein the WN-RLC protocol is configured to use a packet's identifier and offset information to uniquely identify a fragment of a flow of the communications intended for or received from the communications device.

12. The eNB of claim 7, wherein the communications unit comprises:
the first protocol stack, configured to implement the wireless network-aware communications protocol;
a memory coupled to the first protocol stack, the memory to store the communications intended for or received from the communications device; and
a controller coupled to the memory and the first protocol stack, the controller configured to execute programs and applications.

13. The eNB of claim 12, wherein the second protocol stack comprises and a wireless network-aware packet data convergence protocol.

14. The eNB of claim 12, wherein the second protocol stack comprises the WN-RLC protocol and a wireless network-aware media access control protocol.

15. The eNB of claim 14, wherein the WN-RLC protocol is positioned above the wireless network-aware media access control protocol.

16. The eNB of claim 12, wherein the second protocol stack comprises a wireless network-aware media access control protocol.

17. The eNB of claim 7, wherein the first or third protocol stack further comprises a wireless network-aware packet data convergence protocol.

18. The eNB of claim 17, wherein the wireless network-aware packet data convergence protocol is positioned in between the WN-TP and the WN-RLC protocol.

19. The eNB of claim 17, wherein the first or third protocol stack further comprises a wireless network-aware media access control protocol.

20. The eNB of claim 19, wherein the wireless network-aware packet data convergence protocol is positioned between the WN-TP and the WN-RLC protocol, and the WN-RLC protocol is positioned between the wireless network-aware packet data convergence protocol and the wireless network-aware media access control protocol.

21. The eNB of claim 7, wherein the third protocol stack further comprises a wireless network-aware packet data convergence protocol, and a wireless network-aware media access control protocol.

22. A method for enhanced NodeB (eNB) operation, the method comprising:
managing connections of a subset of communications devices in a subnet;
managing a network topology of the subnet;
managing data delivery in and out of the subnet;
managing a coordination of nodes within the subnet for performance optimization;
managing security in the subnet;
receiving a transmission;
processing the transmission utilizing a wireless network-aware communications protocol,
wherein the wireless network-aware communications protocol provides communication between a serving relay, which serves user equipment, and the eNB via an intermediate relay,
wherein the eNB and the serving relay utilize a wireless network-aware tunneling protocol (WN-TP) above a wireless network-aware radio link control (WN-RLC) protocol,
wherein the intermediate relay utilizes the WN-RLC protocol, without utilizing the WN-TP for communications between the serving relay and the eNB,
wherein a first protocol stack of the eNB comprising the WN-TP of the eNB is different from a second protocol stack comprising the WN-RLC protocol of the intermediate relay,
wherein a third protocol stack of the serving relay comprising the WN-TP of the serving relay is different from the second protocol stack comprising the WN-RLC protocol of the intermediate relay, and
wherein the WN-TP has a header including a service flow non-global local identifier (ID) sufficient for identifying an associated tunnel; and
transmitting the processed transmission.

23. The method of claim 22, wherein the first or third protocol stack further comprises a wireless network-aware packet data convergence protocol.

24. The method of claim 23, wherein the WN-RLC protocol is applied after the WN-TP and before the wireless network-aware packet data convergence protocol.

25. The method of claim 22, wherein the first protocol stack further comprises a wireless network-aware media access control protocol.

26. The method of claim 22, wherein the first protocol stack further comprises a wireless network-aware packet data convergence protocol and a wireless network-aware media access control protocol.

27. The method of claim 22, wherein the third protocol stack further comprises a wireless network-aware packet data convergence protocol.

28. The method of claim 22, wherein the third protocol stack further comprises a wireless network-aware media access control protocol.

29. The method of claim 22, wherein the second protocol stack further comprises a wireless network-aware media access control protocol.

30. The method of claim 22, wherein the wireless network-aware communications protocol is configured to reduce communications overhead in transmissions taking place in a wireless network.

\* \* \* \* \*